(12) United States Patent
Lai

(10) Patent No.: US 9,360,741 B2
(45) Date of Patent: Jun. 7, 2016

(54) CAMERA ASSEMBLY AND ROTATING MECHANISM

(71) Applicant: HON HAI PRECISION INDUSTRY CO., LTD., New Taipei (TW)

(72) Inventor: Cheng-Yi Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/523,510

(22) Filed: Oct. 24, 2014

(65) Prior Publication Data

US 2016/0070154 A1 Mar. 10, 2016

(30) Foreign Application Priority Data

Sep. 9, 2014 (TW) .............................. 103131052 A

(51) Int. Cl.
*G03B 17/00* (2006.01)
*G03B 17/56* (2006.01)
(52) U.S. Cl.
CPC .................................... *G03B 17/561* (2013.01)
(58) Field of Classification Search
USPC ......................................................... 396/427
See application file for complete search history.

(56) References Cited

U.S. PATENT DOCUMENTS

| 6,491,401 B2* | 12/2002 | Tachibana | G03B 21/10 353/101 |
| 8,137,006 B2* | 3/2012 | Misawa | G03B 19/12 396/358 |
| 8,167,506 B2* | 5/2012 | Martos | G03B 15/00 396/427 |
| 8,579,524 B2* | 11/2013 | Yu | G03B 17/561 396/427 |
| 2004/0161230 A1* | 8/2004 | Hosokawa | G03B 17/425 396/177 |

FOREIGN PATENT DOCUMENTS

| CN | 200983031 Y | 11/2007 |
| CN | 201198498 Y | 2/2009 |
| CN | 100507700 C | 7/2009 |
| TW | M277851 | 10/2005 |
| TW | M350645 | 2/2009 |
| TW | M375909 U1 | 3/2010 |
| TW | M482022 U | 7/2014 |

* cited by examiner

*Primary Examiner* — Clayton E Laballe
*Assistant Examiner* — Dennis Hancock
(74) *Attorney, Agent, or Firm* — Novak Druce Connolly Bove + Quigg LLP

(57) ABSTRACT

A camera assembly includes a camera and a rotating mechanism configured to drive the camera to rotate. The rotating mechanism includes a base, a driving device, a first driving gear, a second driving gear connected with the camera, and a switch gear. The driving device, the second driving gear, and the switch gear are located on the bracket. The first driving gear is located on the base. The switch gear is driven to selectively engage with the one of the first driving gear and the second driving gear. When the switch gear is connected with the first driving gear, the bracket is driven to rotate and rotate the camera on a first plane. When the switch gear is connected with the second driving gear, the driving device drives the camera to rotate via the switch gear and the second driving gear.

14 Claims, 6 Drawing Sheets

CAMERA ASSEMBLY AND ROTATING MECHANISM

FIELD

The subject matter herein generally relates to camera assemblies, more particularly to a camera assembly with a rotating mechanism.

BACKGROUND

A camera assembly contains a camera and a rotating mechanism for rotating the camera in a horizontal direction and a vertical direction. A typical video camera commonly includes two driving devices to drive the camera in the horizontal direction and the vertical direction respectively.

BRIEF DESCRIPTION OF THE DRAWINGS

Implementations of the present technology will now be described, by way of example only, with reference to the attached figures.

DETAILED DESCRIPTION

Figure 1:
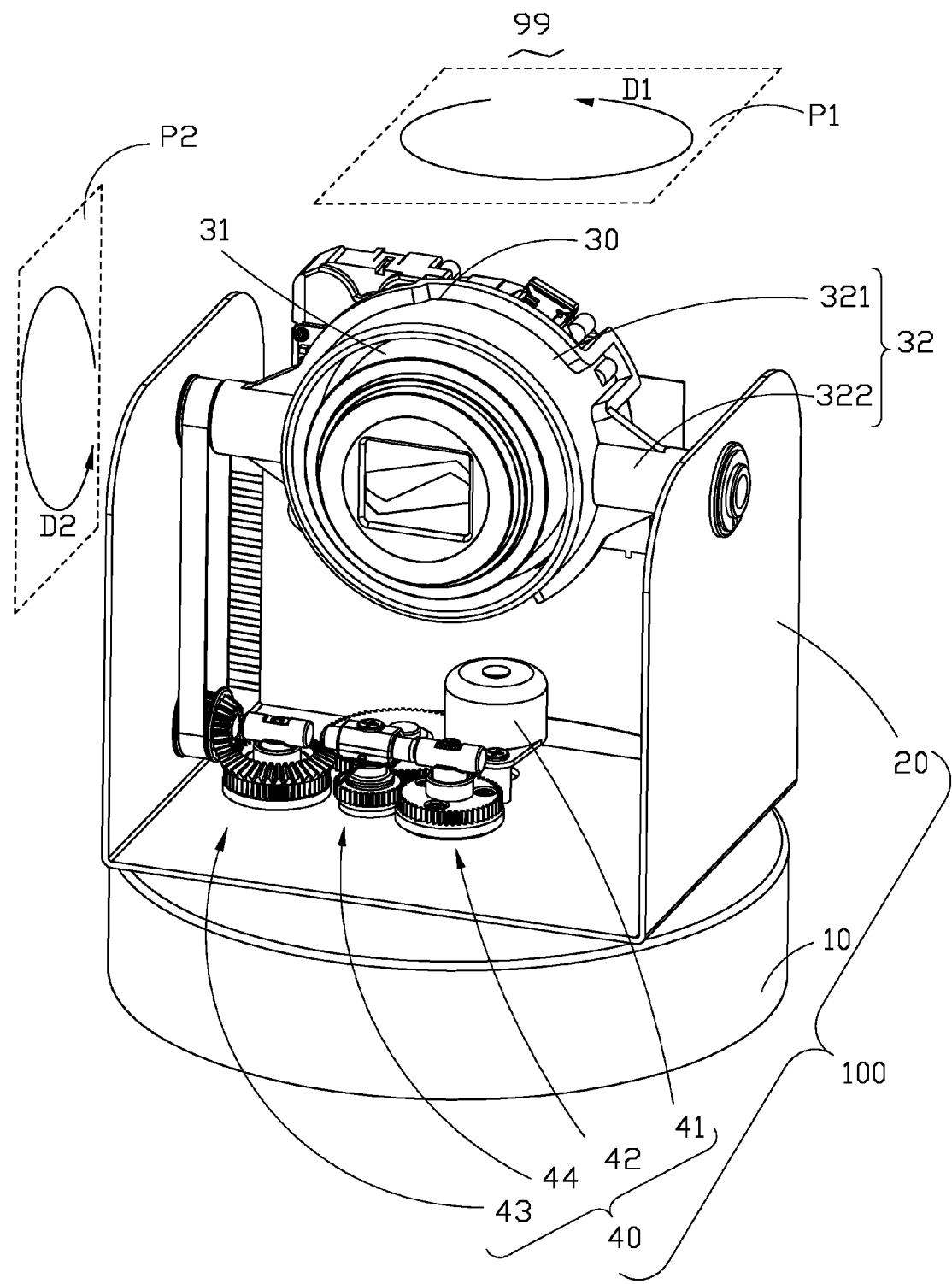
FIG. 1 is an isometric view of a camera assembly comprising a camera and a rotating mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a camera assembly 99.

FIG. 1 illustrates a camera assembly 99. The camera assembly 99 includes a camera 30, and a rotating mechanism 100 driving the camera 30 to rotate along an arrow D1 in a first plane P1 and in a second arrow D2 in a second plane P2. In at least one embodiment, the first plane P1 is a horizontal plane and the second plane P2 is a vertical plane.

Figure 2:
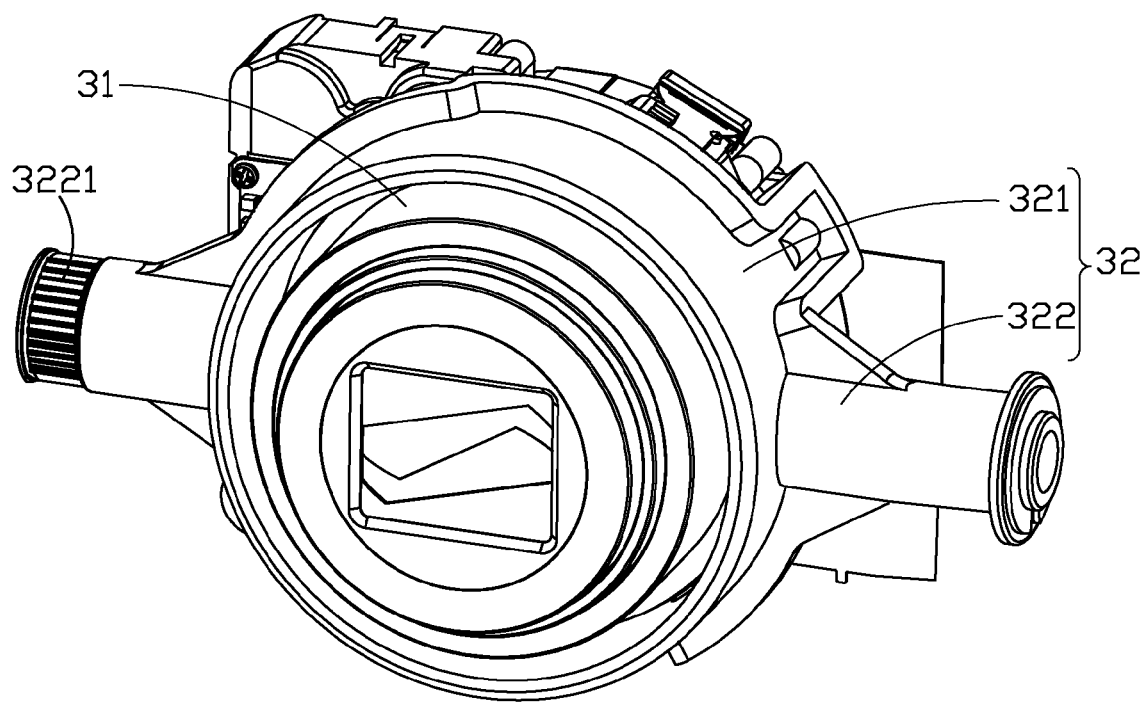
FIG. 2 is an isometric view of the camera shown in FIG. 1.

FIG. 2 illustrates that the camera 30 includes a lens 31 and a lens holder 32. The camera holder 32 includes a main body 321 and a pair of holder shafts 322. The main body 321 holds the lens 31. The two holder shafts 322 protrude from an outside surface of the main body 321 in opposite directions. A teeth portion 3221 is located on one of the holder shafts 322.

Figure 3:
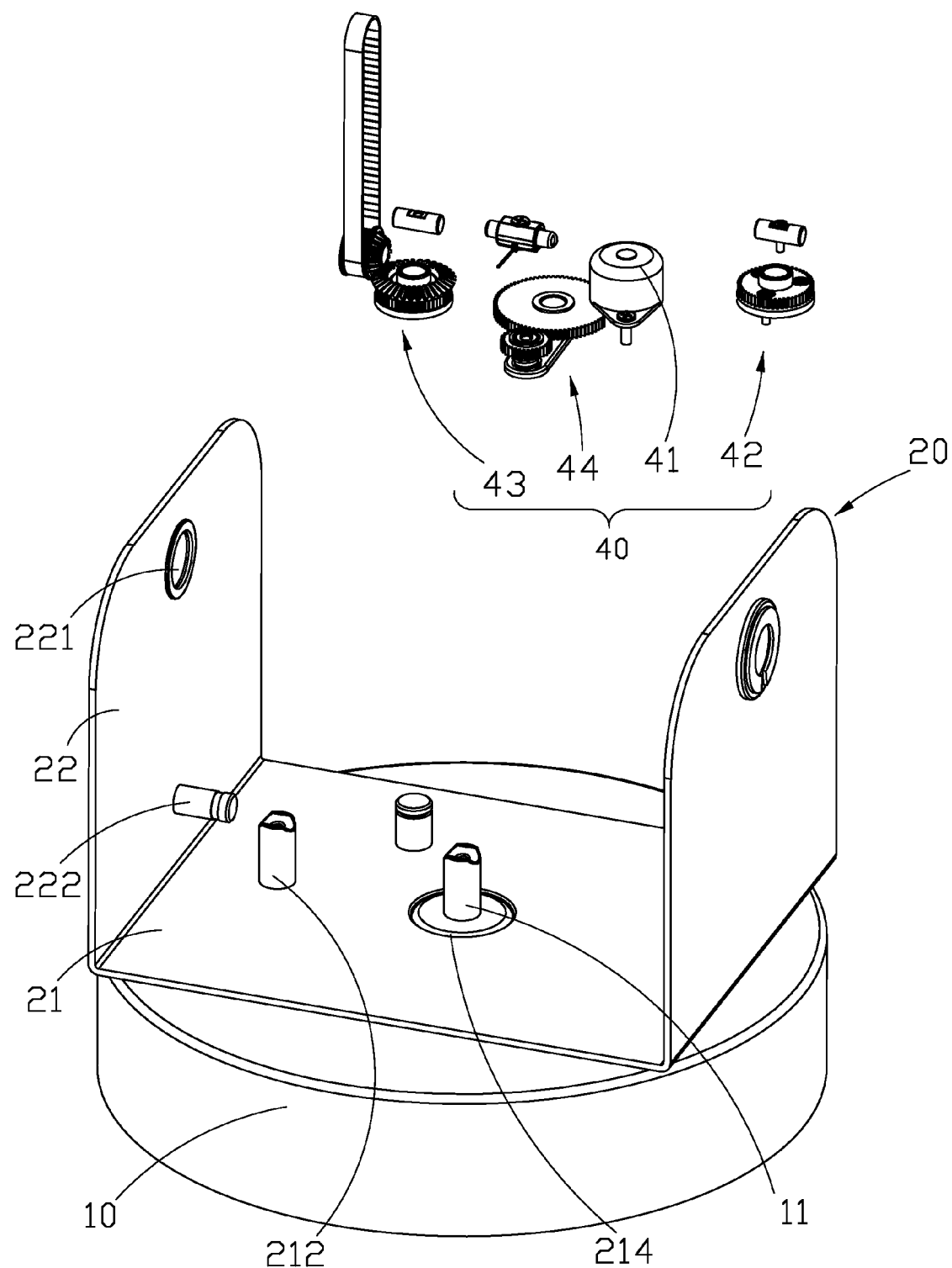
FIG. 3 is a partially exploded view of the camera assembly of FIG. 1 without the camera.
Figure 4:
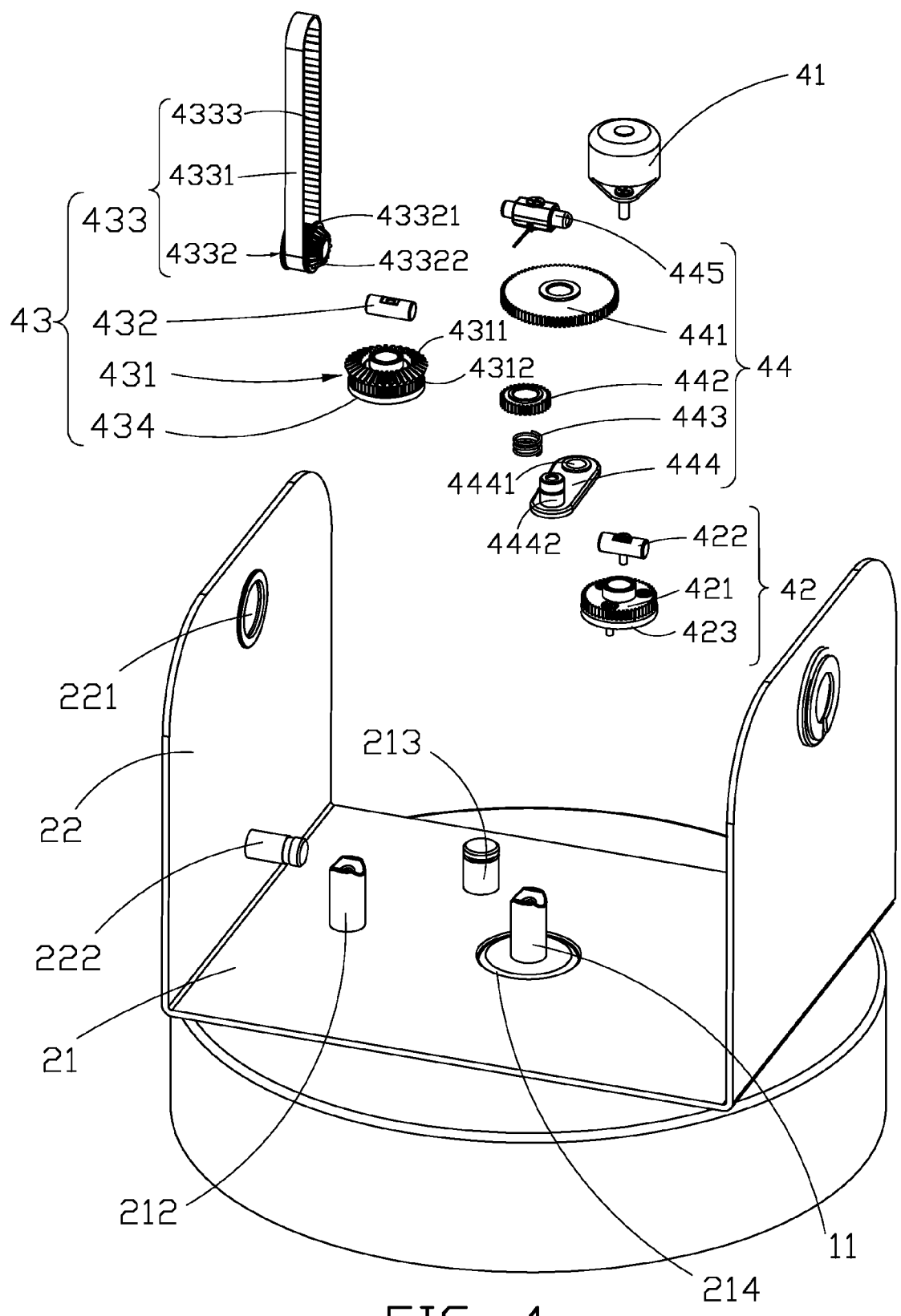
FIG. 4 is another partially exploded view of the camera assembly of FIG. 3.

FIGS. 3 and 4 illustrate the rotating mechanism 100 includes a base 10, a bracket 20 rotatably coupled to the base 10, and a driving module 40 located on the bracket 20. The bracket 20 supports the camera 30 (see FIG. 1). The driving module 40 engages the camera 30 and rotates the camera 30.

The base 10 is a disk having a top surface 11 and a first shaft 12 protruding from the top surface 11. The bracket 20 includes a bottom board 21, and a pair of support boards 22. The support boards 22 are perpendicularly located on opposite sides of the bottom board 21. A first shaft hole 214 is defined in the bottom board 21, and the first shaft 12 is passed through the first shaft hole 214 in order for the bracket 20 to rotate relative to the base 10. A second shaft 212 and a third shaft 213 are located on the bottom board 21. Each of the support boards 22 defines a second shaft hole 221, at the far end of the support boards 22 away from the bottom board 21. A fourth shaft 222 protrudes from one of the two support boards 22 towards the other one, and the fourth shaft 222 is adjacent to the bottom board 21. FIG. 1 illustrates that the holder shaft 322 with the teeth portion 3221 is inserted into one of the second shaft holes 221 defined in one of the supporting boards 22 having the fourth shaft 222, the other holder shaft 322 is inserted into the other second shaft hole 221. As a result, the camera holder 32 with the lens 31 can be pivoted at the bracket 20.

The driving module 40 includes driving device 41 located on the bracket 20, a first driving gear 42 located on the base 10, a second driving gear 43 is located on the bracket 20, and a switch gear 44 located on the bracket 20. The driving device 41 is a motor. One end of the switch gear 44 is connected to the driving device 41, and the other end of the switch gear 44 can be switched to connect with the first driving gear 42 or the second driving gear 44.

The switch gear 44 includes a drive gear 441, a slave gear 442, a friction piece 443, an arm 444, and a first joint piece 445. In the embodiment, the first joint piece 455 is an electromagnet. A third hole 4441 is defined in a first end of the arm 444. A fifth shaft 4442 perpendicularly protrudes from a second end of the arm 444 and away from the bottom board 21. The third shaft 213 passes through the third hole 4441 to pivot the arm 444 to the third shaft 213. The drive gear 441 is rotatably sleeved on the third shaft 213 and above the arm 444, and the drive gear 441 is engaged with the driving device 41. The friction piece 443 is located on the second end of the arm 444 and sleeved on the fifth shaft 4442. In the embodiment, the friction piece 443 is a spring. In other embodiments, the friction piece 443 can be a rubber pad or a sponge pad. The slave gear 442 is rotatably sleeved on the fifth shaft 4442 and compresses the friction piece 443. The slave gear 442 is engaged with the drive gear 441. When the slave gear 442 is rotated relative to the friction piece 443, friction is generated between the slave gear 442 and the friction piece 443 driving the arm 444 to pivot around the third shaft 213. The first joint piece 445 is located on one end of the fifth shaft 4442 away from the bottom board 21.

The first driving gear 42 includes a first slave gear 421, a second joint piece 422 engaged with the first joint piece 445, and a first friction pad 423. The first slave gear 421 is engaged with the slave gear 442, the first slave gear 421 is fixed to the first shaft 12, and the bottom board 21 is between the base 10 and the first slave gear 421. The second joint piece 422 is located on an end of the first shaft 12 away from the bottom board 21. In the embodiment, the second joint piece 422 is a metal block. The first friction pad 423 is located between the first slave gear 421 and the bottom board 21. When the slave gear 442 is engaged with the first slave gear 421, the second end of the arm 444 makes contact with the first friction pad 423, the first friction pad 423 serves as a buffer that absorbs impact between the slave gear 442 and the first slave gear 421. When the slave gear 442 is separated from the first slave gear 421, the first friction pad 423 increases friction between the bottom board 21 and the first slave gear 421, in order to prevent the bracket 20 from shaking or rotating.

The second driving gear 43 includes a second slave gear 431, a third joint piece 432, a linkage unit 433, and a second friction pad 434. The second slave gear 431 is rotatably connected to the second shaft 212. The second slave gear 431 has a first teeth section 4312 and a second teeth section 4311. The second teeth section 4311 is located on a side of the second slave gear 431. In the embodiment, the second teeth section 4311 is away from the bottom board 21. The first teeth section 4312 is engaged with the slave gear 442, and the second teeth section 4311 is engaged with the linkage unit 433. The linkage unit 433 is connected between the second slave gear 431 and the camera 30. The linkage unit 433 includes a drive belt 4331 and a belt gear 4332. The belt gear 4332 is rotatably connected with the fourth shaft 222. The belt gear 4332 has a third teeth section 43321 and a fourth teeth section 43322. The fourth teeth section 43322 is engaged with the second teeth section 4311 of the second slave gear 431. The drive belt 4331 includes a plurality of transmission teeth 4333. The drive belt 4331 is wound around the belt gear 4332 and the camera 30, and the transmission teeth 4333 are engaged with the third teeth section 43321 and the teeth portion 3221 of the hold shaft 322. The second friction pad 434 is located between the second slave gear 431 and the bottom board 21. The second friction pad 434 serves as a buffer that absorbs impact between the slave gear 442 and the second slave gear 431. Furthermore, when the slave gear 442 is separated from the second slave gear 431, friction between the second slave gear 431 and the second friction pad 434 stops the second slave gear 431 from rotating, which prevents rotation of the camera 30 caused by gravity. The third joint piece 432 is located on one end of the second shaft 212 away from the bottom board 21. In the embodiment, the third joint piece 432 is a metal block.

Figure 5:
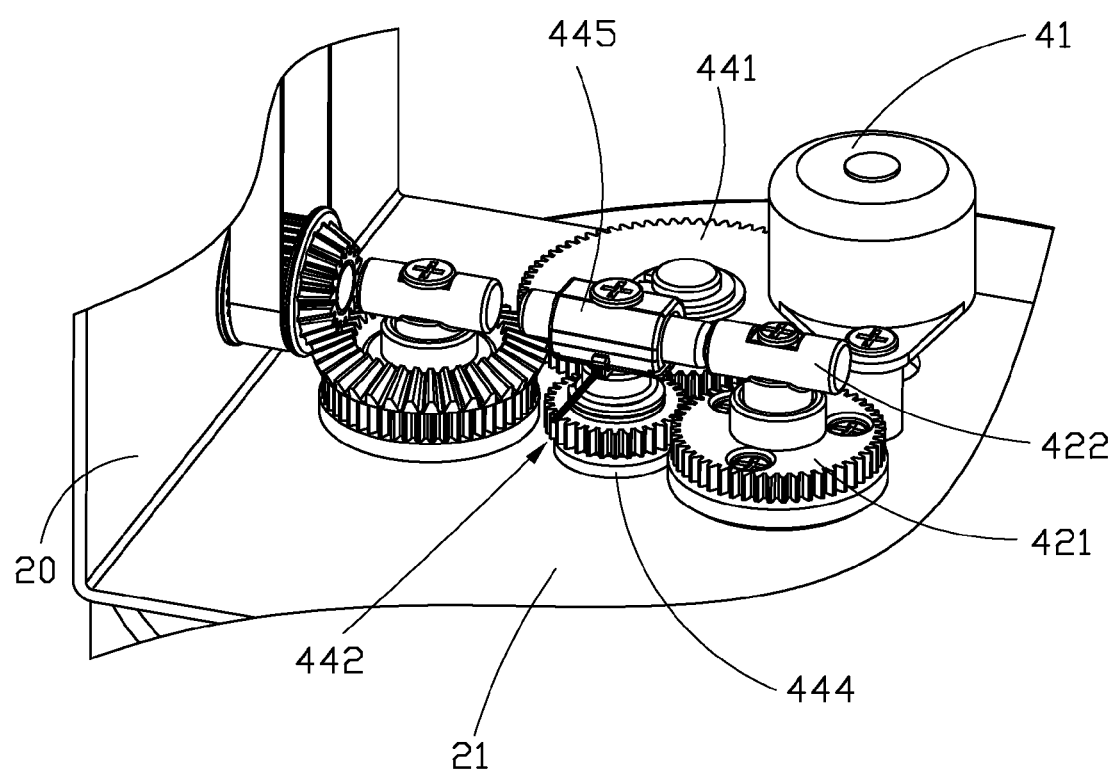
FIG. 5 is an isometric view showing a first state of the rotating mechanism in FIG. 1.

FIG. 5 illustrates how to rotate the camera assembly 99 on the horizontal plane P1. When the drive gear 441 is driven to rotate counterclockwise relative to the bottom board 21 by the driving device 41, the slave gear 442 is driven to rotate clockwise relative to bottom board 21 by the drive gear 441, and a counterclockwise friction between the slave gear 442 and the friction piece 443 is generated that drives the arm 444 to rotate counterclockwise towards the first slave gear 421 and connects the slave gear 442 and the first slave gear 421. At this time, the first joint piece 445 is enabled to attract the second joint piece 422 maintaining the connection between the slave gear 442 and the first slave gear 421. After the first joint piece 445 attracts the second joint piece 422, the user can control the driving device 41 to rotate the drive gear 441 clockwise or counterclockwise freely, therefore, the slave gear 442 can be rotated relative to the first slave gear 421 to rotate the bracket 20 counterclockwise or clockwise. Consequently, FIG. 1 illustrates that the camera 30 can be rotated clockwise or counterclockwise in unison with the bracket 20.

Figure 6:
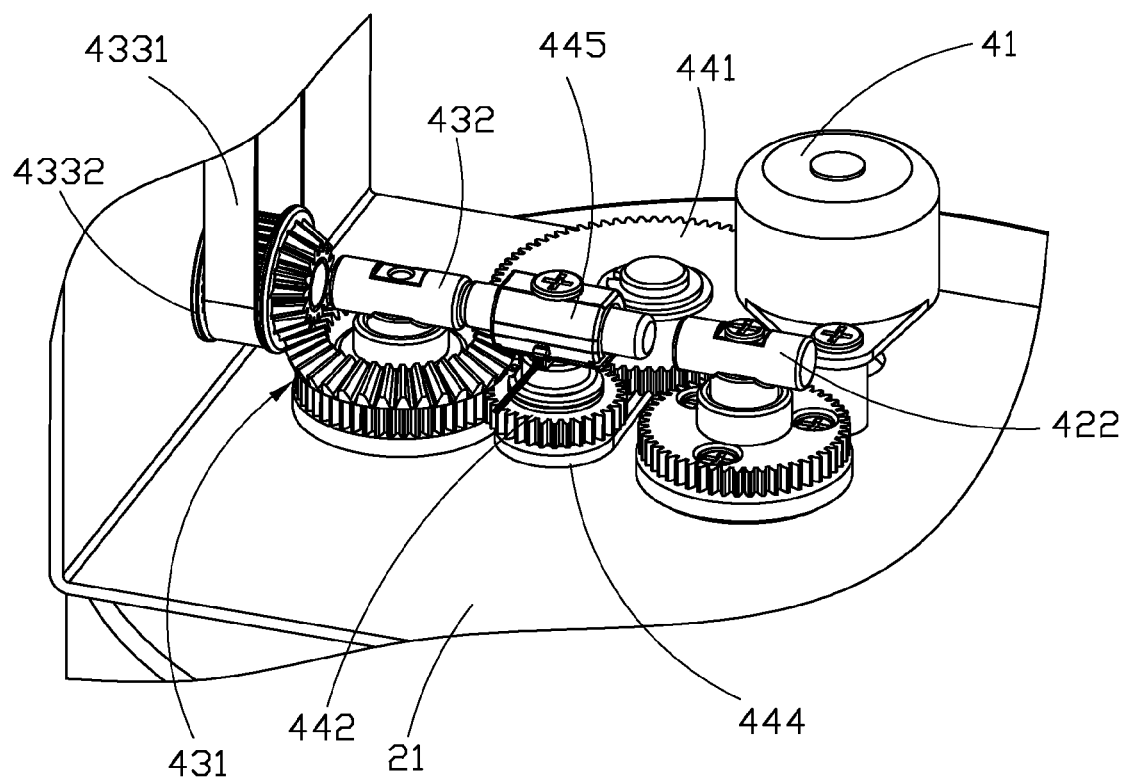
FIG. 6 is an isometric view showing a second state of the rotating mechanism in FIG. 1.

FIG. 6 illustrates how to rotate the camera assembly 99 on the vertical plane P2. If the user needs to rotate the camera assembly 99 on the vertical plane and the first joint piece 445 is still attracting the second joint piece 422, the user should disable the first joint piece 445 first. If the user needs to rotate the camera assembly 99 on the vertical plane and the first joint piece 445 is not attracting the second joint piece 422, the user does not need to take action as describe above. The drive gear 441 is driven to rotate clockwise relative to the bottom board 21, the slave gear 442 is driven to rotate counterclockwise, and a clockwise friction between the slave gear 442 and the friction piece 443 is generated that drives the arm 444 to rotate clockwise towards the second slave gear 431 connecting the slave gear 442 and the second slave gear 431. At this time, the first joint piece 445 is enabled to attract the third joint piece 432 to keep the connection between the slave gear 442 and the second slave gear 431. After the first joint piece 445 attracts the third joint piece 432, if the driving device 41 continues to drive the drive gear 441 to rotate clockwise, the second slave gear 431 is driven to rotate clockwise, so the belt gear 4332 is driven to rotate counterclockwise, thereby driving the camera 30 (see FIG. 1) to rotate counterclockwise on the vertical plane via the drive belt 4331. Likewise, after the first joint piece 445 attracts the third joint piece 432, the driving device 41 rotates the drive gear 441 counterclockwise and the camera 30 (see FIG. 1) is rotated clockwise on the vertical plane.

With the camera assembly 99 describe above, because the switch gear 44 can be switched to connect with the first driving gear 42 or the second driving gear 43, the camera 30 can be driven to rotate on the horizontal plane and the vertical plane with only one driving device 41.

Many details are often found in the art such as the other features of a camera assembly and rotating mechanism. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A camera assembly comprising:
 a camera; and
 a rotating mechanism configured to drive the camera to rotate, comprising:
 a base;
 a bracket rotatably coupled to the base, the camera being rotatably coupled on the bracket; and
 a driving module comprising:
 a driving device;
 a first driving gear;
 a second driving gear; and
 a switch gear configured to be driven by the driving device to rotate to selectively engage with one of the first driving gear and the second driving gear; when the switch gear rotates and engages with the first driving gear, the bracket is driven by the first driving gear to rotate and rotate the camera on a first plane; when the switch gear rotates and engages with the second driving gear, the camera is driven by the second driving gear to rotate on a second plane perpendicular to the first plane, wherein a first joint piece is located on the switch gear, a second joint piece is located on the first driving gear, a third joint piece is located on the second driving gear, when the switch gear engages with the first driving gear, the first joint piece connected with the second joint piece preventing the first driving gear and the switch gear from separating from each other; when the switch gear engages with the second driving gear, the first joint piece connected with the third joint piece preventing the second driving gear and the switch gear from separating from each other.

2. The camera assembly of claim 1, wherein the first driving gear, the second driving gear, and the switch gear are located on the bracket, and the switch gear is located between the first driving gear and the second driving gear.

3. The camera assembly of claim 2, wherein the switch gear comprises a arm, a drive gear, a slave gear, a first end of the arm is pivoted on the bracket, the slave gear is rotatably located on a second end of the arm, the drive gear is engaged with the driving device and the slave gear, the driving device drives the drive gear to rotate the arm, the arm moves the slave gear to one of the first driving gear or the second driving gear to drive the one of the first driving gear or the second driving gear.

4. The camera assembly of claim 3, wherein the switch gear further comprises a friction piece; when the slave gear is rotated, friction between the friction piece and the slave gear is generated, and the friction drives the arm to rotate towards one of the first driving gear or the second driving gear.

5. The camera assembly of claim 1, wherein the first driving gear comprises a first slave gear which is static relative to the base, when the switch gear engages with the first slave gear, the bracket is driven to rotate and rotate the camera around the first slave gear.

6. The camera assembly of claim 1, wherein the second driving gear comprises a second slave gear and a linkage unit, the second slave gear is pivoted on the bracket, the linkage unit interconnects the second slave gear and the camera, when the switch gear is connected to the second slave gear and is rotated, the switch gear drives the second slave gear to rotate, and the second slave gear drives the camera to rotate via the linkage unit.

7. The camera assembly of claim 6, wherein the linkage unit comprises a drive belt and a belt gear, the belt gear is pivoted on the bracket and is engaged with the second slave gear, the drive belt is connected between the belt gear and the camera.

8. A rotating mechanism for driving an object to rotate, comprising:
a base;
a bracket rotatably coupled to the base supporting the object; and
a driving module comprising:
a driving device;
a first driving gear;
a second driving gear; and
a switch gear configured to be driven by the driving device to rotate to selectively engage with one of the first driving gear and the second driving gear; when the switch gear rotates and engages with the first driving gear, the bracket is driven by the first driving gear to rotate and rotate the object on a first plane; when the switch gear rotates and engages with the second driving gear, the object is driven by the second driving gear to rotate on a second plane perpendicular to the first plane; wherein a first joint piece is located on the switch gear, a second joint piece is located on the first driving gear, a third joint piece is located on the second driving gear, when the switch gear engages with the first driving gear, the first joint piece connected with the second joint piece preventing the first driving gear and the switch gear from separating from each other;
when the switch gear engages with the second driving gear, the first joint piece connected with the third joint piece preventing the second driving gear from separating from each other.

9. The rotating mechanism of claim 8, wherein the first driving gear, the second driving gear, and the switch gear are located on the bracket, and the switch gear is located between the first driving gear and the second driving gear.

10. The rotating mechanism of claim 9, wherein the switch gear comprises a arm, a drive gear, a slave gear, a first end of the arm is pivoted on the bracket, the slave gear is rotatably located on a second end of the arm, the drive gear is engaged with the driving device and the slave gear, the driving device drives the drive gear to rotate the arm, the arm moves the slave gear to one of the first driving gear or the second driving gear to drive the one of the first driving gear or the second driving gear.

11. The rotating mechanism of claim 10, wherein the switch gear further comprises a friction piece; when the slave gear is rotated, a friction between the friction piece and the slave gear is generated, and the friction drives the arm to rotate towards one of the first driving gear or the second driving gear.

12. The rotating mechanism of claim 8, wherein the first driving gear comprises a first slave gear which is static relative to the base, when the switch gear engages with the first slave gear, the bracket is driven to rotate and rotate the object around the first slave gear.

13. The rotating mechanism of claim 8, wherein the second driving gear comprises a second slave gear and a linkage unit, the second slave gear is pivoted on the bracket, the linkage unit interconnects the second slave gear and the camera, when the switch gear is connected to the second slave gear and is rotated, the switch gear drives the second slave gear to rotate, and the second slave gear drives the camera to rotate via the linkage unit.

14. The rotating mechanism of claim 13, wherein the linkage unit comprises a drive belt and a belt gear, the belt gear is pivoted on the bracket and is engaged with the second slave gear, the drive belt is connected between the belt gear and the camera.

* * * * *